(12) United States Patent
Cross et al.

(10) Patent No.: US 10,696,889 B2
(45) Date of Patent: *Jun. 30, 2020

(54) ADDITIVES FOR IMPROVING HYDROCARBON RECOVERY

(71) Applicant: ECOLAB USA INC., St. Paul, MN (US)

(72) Inventors: Kimberly Jantunen Cross, Batavia, IL (US); Anthony G. Sommese, Aurora, IL (US); Edward Maharajh, Calgary (CA)

(73) Assignee: Ecolab USA Inc., St. Paul, MN (US)

( * ) Notice: Subject to any disclaimer, the term of this patent is extended or adjusted under 35 U.S.C. 154(b) by 58 days.

This patent is subject to a terminal disclaimer.

(21) Appl. No.: 15/839,572

(22) Filed: Dec. 12, 2017

(65) Prior Publication Data

US 2018/0100098 A1     Apr. 12, 2018

Related U.S. Application Data

(60) Division of application No. 13/554,515, filed on Jul. 20, 2012, now Pat. No. 9,879,512, which is a
(Continued)

(51) Int. Cl.
*C09K 8/584* (2006.01)
*E21B 43/16* (2006.01)
(Continued)

(52) U.S. Cl.
CPC ............... *C09K 8/584* (2013.01); *C09K 8/58* (2013.01); *C09K 8/592* (2013.01); *E21B 43/16* (2013.01); *E21B 43/24* (2013.01)

(58) Field of Classification Search
CPC .......... C09K 8/58; C09K 8/584; C09K 8/592; E21B 43/16; E21B 43/24
See application file for complete search history.

(56) References Cited

U.S. PATENT DOCUMENTS 2,862,558 A    12/1958 Dixon et al.
3,954,141 A    5/1976 Allen et al.
(Continued)

FOREIGN PATENT DOCUMENTS

CN    1777735 A    5/2006
CN    101945921 A   1/2011
(Continued)

OTHER PUBLICATIONS

1-Butanol Material Safety Data Sheet; ScienceLab.com, May 2013, pp. 1-6.
(Continued)

*Primary Examiner* — Frances Tischler
(74) *Attorney, Agent, or Firm* — Kagan Binder, PLLC

(57) ABSTRACT

Processes for recovering hydrocarbons from subterranean formations are disclosed. The hydrocarbon can be contacted with water or steam and one or more additives, and subsequently recovered. The hydrocarbon can be selected from the group consisting of heavy or light crude oil, bitumen, an oil sand ore, a tar sand ore and combinations thereof. The additive can be, for example, a fluorinated hydrocarbon, one or more alcohols, combinations of alcohols, and combinations of one or more alcohols and one or more fluorinated hydrocarbons. Compositions or mixtures including hydrocarbons, water or steam, and additives are also disclosed.

14 Claims, 5 Drawing Sheets

Related U.S. Application Data continuation-in-part of application No. 13/158,919, filed on Jun. 13, 2011, now Pat. No. 9,150,776.

(51) Int. Cl.
  *C09K 8/58* (2006.01)
  *C09K 8/592* (2006.01)
  *E21B 43/24* (2006.01)

(56) References Cited

U.S. PATENT DOCUMENTS

| | | |
|---|---|---|
| 4,068,716 A | 1/1978 | Allen |
| 4,141,415 A | 2/1979 | Wu et al. |
| 4,217,202 A | 8/1980 | Paraskos |
| 4,316,808 A | 2/1982 | Blair, Jr. |
| 4,425,242 A | 1/1984 | Penny et al. |
| 4,454,917 A | 6/1984 | Poston |
| 4,610,729 A | 9/1986 | Keane |
| 4,823,873 A | 4/1989 | Karydas |
| 4,884,635 A | 12/1989 | McKay et al. |
| 4,921,619 A | 5/1990 | Karydas |
| 4,923,009 A | 5/1990 | Watkins |
| 4,975,208 A | 12/1990 | Watkins |
| 6,305,472 B2 | 10/2001 | Richardson et al. |
| 7,216,705 B2* | 5/2007 | Saini .................. C09K 8/68 166/276 |
| 7,612,022 B2 | 11/2009 | Shpakoff et al. |
| 7,691,788 B2 | 4/2010 | Tan et al. |
| 8,418,759 B2 | 4/2013 | Moore et al. |
| 8,678,090 B2 | 3/2014 | Baran, Jr. et al. |
| 8,701,763 B2 | 4/2014 | Baran, Jr. et al. |
| 8,939,208 B2 | 1/2015 | Cross |
| 9,150,776 B2 | 10/2015 | Cross |
| 2005/0193923 A1 | 9/2005 | Goldman |
| 2005/0194292 A1 | 9/2005 | Beetge et al. |
| 2006/0076273 A1 | 4/2006 | Cobb |
| 2008/0149533 A1* | 6/2008 | Yoo .................. C07C 51/265 208/221 |
| 2009/0078415 A1 | 3/2009 | Fan et al. |
| 2009/0159288 A1 | 6/2009 | Horvath Szabo et al. |
| 2010/0012331 A1 | 1/2010 | Larter et al. |
| 2010/0130386 A1 | 5/2010 | Chakrabarty |
| 2010/0243248 A1 | 9/2010 | Golomb |
| 2011/0201531 A1 | 8/2011 | Sharma et al. |

FOREIGN PATENT DOCUMENTS

| | | |
|---|---|---|
| CN | 101945971 A | 1/2011 |
| CN | 102083940 A | 6/2011 |
| CN | 102149787 A | 8/2011 |
| WO | 8204440 | 12/1982 |
| WO | 2009014586 | 1/2009 |

OTHER PUBLICATIONS

International Search Report and Written Opinion for PCT/US2012/041984, dated Feb. 28, 2013, 7 pages.

European Search Report for Appln. No. 12799762.5 dated Jul. 6, 2015.

FC-129 Material Safety Data Sheet; 3M Industrial Chemical Products Division; Jan. 21, 1991; pp. 1-4.

Office Action dated Jul. 22, 2019 in Canadian Application No. 2,821,184, 4 pages.

\* cited by examiner

ADDITIVES FOR IMPROVING HYDROCARBON RECOVERY

CROSS-REFERENCE TO RELATED APPLICATION

This application is a divisional of U.S. patent application Ser. No. 13/554,515, filed Jul. 20, 2012, which claims priority to, and is a continuation-in-part of, U.S. Ser. No. 13/158,919, which was filed on Jun. 13, 2011, and titled ADDITIVES FOR IMPROVING HYDROCARBON RECOVERY, the contents of which are incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING, A TABLE, OR A COMPUTER PROGRAM

Not applicable.

BACKGROUND OF THE INVENTION

1. Field of the Invention

The disclosure pertains to hydrocarbon production, extraction or recovery. In particular, the disclosure pertains to hydrocarbon production, extraction or recovery methods incorporating steam, water and/or additives.

2. Description of the Related Art

At or beneath its surface, the earth contains deposits of crude oil and bituminous sands, known as tar sands or oil sands. If these deposits are located sufficiently close to the earth's surface, they can be recovered using surface or strip mining techniques. The mined ore typically contains about 10-15% bitumen, 80-85% mineral matter with the balance being water, and requires separation of the valued bitumen product from the mineral matter. This bitumen liberation process begins by initially mixing or slurrying the ore with warm water in a hydrotransport line. The resultant slurry is then fed to a primary separation vessel or cell. In this separation process, additional warm water is added and the majority of the liberated bitumen will become attached to air bubbles where it is recovered by flotation. The bitumen liberation and recovery process generally occurs at a pH of about 8.5, which is generally obtained with the assistance of caustic soda. The coarse mineral matter is removed from the bottom of the vessel and a middlings portion, containing water, fine mineral matter, and suspended bitumen is sent for further bitumen recovery.

If the crude oil or bituminous sands are located sufficiently below the surface of the earth, oil wells can be drilled to assist in the extraction of these materials. However, heavy hydrocarbons can prove difficult to recover or produce due to their high viscosities. Various extraction, recovery, or production methods are known in the art such as flooding the formation with steam in an attempt to reduce the viscosity of the hydrocarbons to enable flow and aid in production.

One such method known as Cyclic Steam Simulation or the "huff-and-puff" method involves stages of infecting high pressure steam, soaking the formation, and production. The initial stage involves steam injection for a period of weeks to months to heat the hydrocarbon, bitumen or heavy oil resource in the reservoir, thereby reducing its viscosity such that it will be able to flow. Following injection, the steam is allowed to soak in the formation for a period of days to weeks to allow heat to further penetrate the formation. The heavy oil, sufficiently reduced in viscosity, is then produced from the same well until production begins to decline upon which time the three step cycle is repeated.

Another recovery or production method used in the art is referred to as steam assisted gravity drainage (SAGD). The SAGD recovery method relies on two parallel, horizontal wells approximately 1 km in length. An upper "injector well" resides above a lower "producing well." The producing well is situated as close as possible to the bottom of the reservoir. Initially, steam is injected into both wells to begin heating the formation. After a period of time, the formation is sufficiently heated such that the viscosity of the hydrocarbons or bitumen is reduced and the hydrocarbons or bitumen are now able to enter the production well. Once this occurs, steam injection into the production well is ceased.

Low pressure steam is continuously injected into the injector well, resulting in the formation of a steam chamber, which extends laterally and above as the process continues. At the edge of the steam chamber, the steam releases its latent heat into the formation. This process heats the hydrocarbons and/or bitumen causing it to be sufficiently reduced in viscosity to drain along the edge of the steam chamber under the influence of gravity to the lower producing well. It can then be pumped to the surface along with the result steam condensate. At that point, the formed water and bitumen emulsion is separated.

In addition to imparting a viscosity reduction on the hydrocarbons and/or bitumen, the steam condenses and a hydrocarbon-in-water emulsion forms showing the hydrocarbon to travel more readily to the producing well. SAGD processes typically recover about 55% of the original hydrocarbon or bitumen-in-place over the lifetime of the well.

Although this process has advantages, there are drawbacks as well. For example, with respect to bitumen production, the SAGD process relies on the energy intensive production of steam to assist with bitumen recovery. It requires natural gas, significant amounts of fresh water, and water recycling plants. Further, as the method relies upon gravity drainage, production rates can be limited due to the high viscosity of the bitumen. Although the prior art has contemplated different variations to the SAGD process, such as the addition of certain additives, the additives have not been successful and their presence has resulted in, for example, emulsions of additive, water, and bitumen that cannot be broken because the additives have caused the emulsion to be stable.

Therefore, seeking out additives that could increase the amount of bitumen produced for the same steam input is highly desirable. Additives could possess properties such as directly improving the heat efficiency within a formation as well as reducing the oil-water interfacial tension. Moreover, successful additives will lower the steam to oil ratio meaning less steam will be necessary to produce the same amount of bitumen due to the presence of the additive. Also, desirable additives will not interfere with the resulting emulsion such that it cannot be broken. Finally, a successful additive should be volatile enough to be carried with the steam through the sand pack to reach the bitumen pay.

BRIEF SUMMARY OF THE INVENTION

A process for recovering a hydrocarbon from a subterranean formation is disclosed. The subterranean formation can include any number of wells, such as two wells, three wells, etc. The disclosed process includes the steps of contacting a hydrocarbon from a subterranean formation with steam or water, contacting the hydrocarbon with one or more alcohols, or one or more fluorinated hydrocarbons, or a combination of one or more alcohols and one or more fluorinated hydrocarbons, and recovering the hydrocarbon. The hydrocarbon can be contacted by the steam or water and/or the one or more alcohols, or one or more fluorinated hydrocarbons, or combination of one or more alcohols and one or more fluorinated hydrocarbons, at any time during recovery of the hydrocarbon. The hydrocarbon is selected from the group consisting of light or heavy crude oil, bitumen, an oil sand ore, a tar sand ore, and combinations thereof. The hydrocarbon can be contacted with the steam or water and one or more alcohols, or one or more fluorinated hydrocarbons, or a combination of one or more alcohols and one or more fluorinated hydrocarbons, inside of the subterranean formation or outside of the subterranean formation. The steam and the one or more alcohols, or one or more fluorinated hydrocarbons, or combination of one or more alcohols and one or more fluorinated hydrocarbons, can be injected into the subterranean formation independently or as a mixture. The process can be a SAGD process that incorporates the addition of the one or more alcohols, or one or more fluorinated hydrocarbons, or a combination of one or more alcohols and one or more fluorinated hydrocarbons.

A process for the recovery of bitumen from a subterranean formation is also disclosed. The subterranean formation can include any number of wells, such as two wells, three wells, etc. The process includes the steps of contacting the bitumen with steam or water, contacting the bitumen with one or more alcohols, or one or more fluorinated hydrocarbons, or a combination of one or more alcohols and one or more fluorinated hydrocarbons, and recovering the bitumen. The bitumen can be contacted by the steam or water and/or the one or more alcohols, or one or more fluorinated hydrocarbons, or combination of one or more alcohols and one or more fluorinated hydrocarbons, at any time during recovery of the bitumen. The bitumen can be contacted with the steam or water and one or more alcohols, or one or more fluorinated hydrocarbons, or combination of one or more alcohols and one or more fluorinated hydrocarbons, inside of the subterranean formation or outside of the subterranean formation. The steam and the one or more alcohols, or one or more fluorinated hydrocarbons, or combination of one or more alcohols and one or more fluorinated hydrocarbons, can be injected into the subterranean formation independently or as a mixture. The process can be a SAGD process that incorporates the one or more alcohols, or one or more fluorinated hydrocarbons, or a combination of one or more alcohols and one or more fluorinated hydrocarbons.

A composition or mixture of components is also disclosed. The composition or mixture includes a hydrocarbon, water or steam, and one or more alcohols, or one or more fluorinated hydrocarbons, or a combination of one or more alcohols and one or more fluorinated hydrocarbons. The hydrocarbon can be selected from the group consisting of light or heavy crude oil, bitumen, an oil sand ore, a tar sand ore, and combinations thereof.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the an that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION OF THE INVENTION

Figure 1:
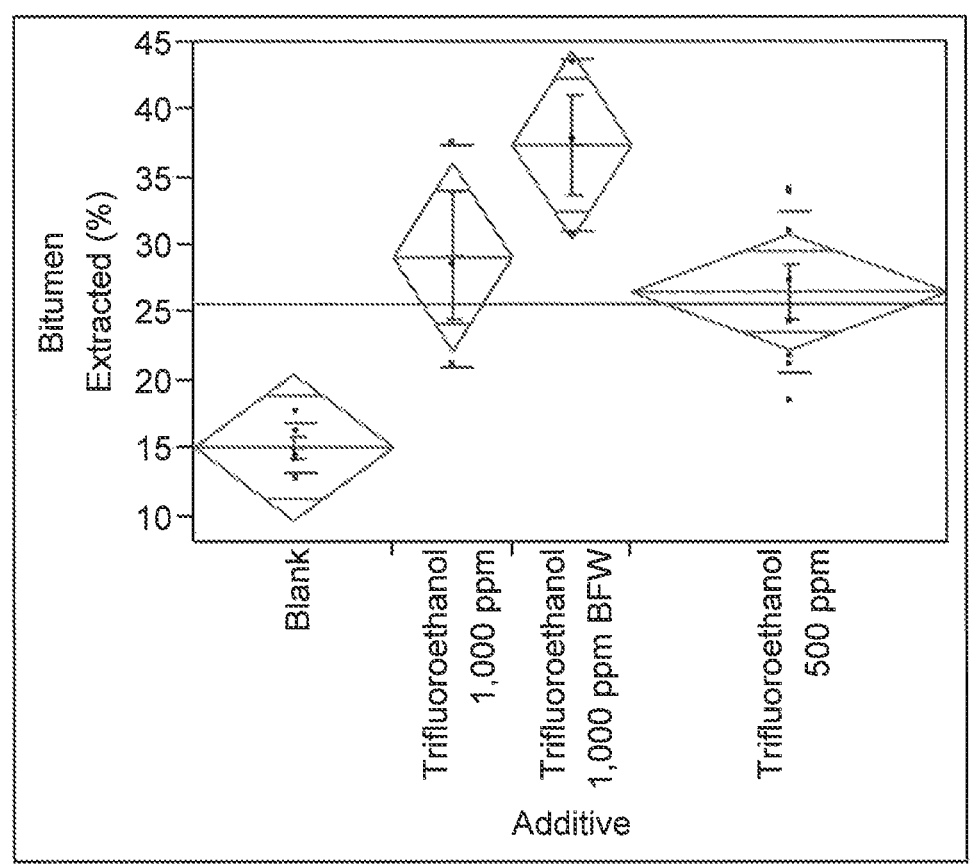
FIG. 1 is a one-way analysis of bitumen extracted (%) vs. blank and trifluoroethanol.

This disclosure relates to methods of producing or recovering hydrocarbons, such as light or heavy crude oil, bitumen, and oil or tar sand ores. Compositions and mixtures including the produced or recovered hydrocarbons are also disclosed herein.

It has been found that addition of additives, such as fluorinated hydrocarbons, greatly enhances hydrocarbon extraction. In the present application, hydrocarbon is understood to mean viscous or heavy crude oil, light crude oil, tar sands or oil sands oil, or bitumen.

It has also been found that addition of additives, such as one or more alcohols, greatly enhances hydrocarbon extraction.

Further, it has been found that addition of additives, such as certain combinations of one or more alcohols or combinations of one or more alcohols and one or more fluorinated hydrocarbons greatly enhances hydrocarbon extraction.

A process for recovering a hydrocarbon is disclosed involving two parallel, horizontal wells. The wells can be, for example, approximately 1 km in length, but other lengths are acceptable as well. The process can be an SAGD process or any other suitable process. An upper injector well resides above a lower producing well in the SAGD process. The wells can be separated by any suitable distance, for example, approximately 4-6 meters. Initially, steam is injected downhole into one or both of the wells where it condenses and begins heating the formation and the hydrocarbon(s) therein. Generally, steam is injected into the well head and this process is readily understood by those skilled in the art. The steam can be injected at high pressures and can be at a temperature of about 500° C. After a period of time, the formation is sufficiently heated such that the viscosity of the hydrocarbon is reduced.

Over time, low pressure steam can be continuously injected into the injector well, resulting in the formation of a steam chamber, further heating the hydrocarbon causing it to be sufficiently reduced in viscosity to drain along the edge of the steam chamber to the lower producing well by way of gravity where it can be pumped to the surface along with the condensed steam and/or the additive(s). At that point, the water and/or additive(s) are separated from the hydrocarbon in water emulsion and the hydrocarbon can be recovered using various known methods in the art such as "breaking" the emulsion.

An additive according to the present disclosure, such as a fluorinated hydrocarbon, one or more alcohols, or combinations of one or more alcohols and one or more fluorinated hydrocarbons, can also be injected into either one of the wells, or both of the wells. The additive(s) can be injected independently of the steam or it can be added as a mixture with the steam. The steam may be injected continuously or intermittently into one or both of the wells. Moreover, the additive(s) may be injected continuously or intermittently into one or both of the wells. Also, if the steam and additive(s) are added as a mixture, the mixture can be added either continuously or intermittently into one or both of the wells.

Additive(s) addition may occur at, but is not limited to, the steam header, at the well head, or it can be added into the boiler feed water.

The additive(s) can be injected into one or both of the wells at any point during production such as when production begins or when production begins to diminish. For example, when hydrocarbon production begins to decline in the well, the additive(s) described herein can be added. By adding the additive(s) after production has begun to decline, the recovery level can be brought back to or near an optimal or peak hydrocarbon recovery level.

A process for the recovery of bitumen from a subterranean formation is also disclosed. The process can be a SAGD process and the bitumen can be recovered from a hydrocarbon bearing ore, such as oil sands or tar sands. The process may involve two parallel, horizontal wells, which are drilled in an oil sand or tar sand formation. The wells can be, for example, approximately 1 km in length, but other lengths are acceptable as well. An upper injector well resides above a lower producing well. The wells cast be separated by any suitable distance, for example, approximately 4-6 meters. Initially, steam is injected downhole into one or both of the wells where it condenses and begins heating the formation and the bitumen therein. Generally, steam is injected into the well head and this process is readily understood by those skilled in the art. The steam condenses and heats the formation and the bitumen residing therein. The steam can be injected at high pressures and can be at a temperature of about 500° C. After a period of time, the formation is sufficiently heated such that the viscosity of the bitumen is reduced.

Over time, low pressure steam can be continuously injected into the injector well, resulting in the formation of a steam chamber, further heating the bitumen causing it to be sufficiently reduced in viscosity to drain along the edge of the steam chamber to the lower producing well by way of gravity where it can be pumped to the surface along with the condensed steam and/or the additive(s). At that point, the water and/or additive(s) are separated from the bitumen in water emulsion and the bitumen can be recovered using various known methods in the art such as "breaking" the emulsion.

An additive according to the present disclosure, such as one or more fluorinated hydrocarbons, one or more alcohols, or combinations of one or more alcohols and one or more fluorinated hydrocarbons, can also be injected into either one of the wells, or both of the wells, to contact the bitumen. The additive(s) can be injected independently of the steam or can be added as a mixture with the steam. The steam may be injected continuously or intermittently into one or both of the wells. Moreover, the additive(s) may be injected continuously or intermittently into one or both of the wells. Also, if the steam and additive(s) are added as a mixture, the mixture can be added either continuously or intermittently into one or both of the wells.

Additive(s) addition may occur at, but is not limited to, the steam header, at the well head, or it can be added into the boiler feed water.

The additive(s) can be injected into one or both of the wells at any point during recovery such as when production begins or when production begins to diminish. For example, when bitumen production begins to decline in the well, the additive(s) described herein can be added. By adding the additive(s) after production has begun to decline, the recovery level can be brought back to or near an optimal or peak bitumen recovery level.

It is noted that when carrying out the recovery or production methods disclosed herein, any number of wells, such as two wells, three wells, even a single well, can be used. No matter the number of wells selected, the steam and additive(s) described herein can be injected into any of the wells, or all of the wells. The additive(s) can be injected independently of the steam or it can be added as a mixture with the steam into any of the wells. The steam may be injected continuously or intermittently into any of the wells. Moreover the additive(s) may be injected continuously or intermittently into any of the wells. Also, if the steam and additive(s) are added as a mixture, the mixture can be added either continuously or intermittently into any of the wells.

Also, hydrocarbons can be mined or extracted from a formation and the hydrocarbon can be separated outside of the formation using any known method in the art such as, for example, a primary separation vessel. Such a separation process can be carried out with the assistance of heated water, the additive(s) disclosed herein, and optionally other additives, such as caustic soda. In certain variations, the hydrocarbons are led into hydrotransport lines and contacted therein by the heated water and optionally the additive(s), which conditions the ore and starts the bitumen liberation process. The resultant slurry can then be fed into one or more primary separation vessels. A hydrocarbon primary froth is separated at the top of the vessel while the sand settles at the bottom. The hydrocarbon froth is then subjected to further processing.

The contents other than those in the hydrocarbon primary froth can go through secondary separation processes where further hydrocarbon can be recovered.

The additives(s) disclosed herein can be added either separately, or as a mixture with the heated water, at any time during primary, secondary, and/or tertiary separation or recovery, to enhance the hydrocarbon recovery and/or minimize the amount of water used.

Further, bitumen can be mined or extracted from a formation and the bitumen can be separated from, for example, oil or tar sand, outside of the formation using any known method in the art such as, for example, a primary separation vessel. Such a separation process can be carried out with the assistance of heated water, the additive(s) disclosed herein, and optionally other additives, such as caustic soda. In certain variations, the oil or tar sand bitumen is fed into hydrotransport lines and contacted therein by the heated water and optionally the additive(s), which conditions the ore and starts the bitumen liberation process. The resultant slurry can then be fed into one or more primary separation vessels. A bitumen primary froth is separated at the top of the vessel while the sand settles at the bottom. The bitumen froth is then subjected to further processing.

The contents other than those in the bitumen primary froth can go through secondary separation processes where further bitumen can be recovered.

The additive(s) disclosed herein can be added either separately, or as a mixture with the heated water, at any time daring separation or secondary separation, to enhance the bitumen recovery and/or minimize the amount of water or used.

Compositions are also disclosed herein. The compositions can include one or more hydrocarbons, water or steam, and one or more additive(s). The additive(s) can be the additives described in the present application, such as the fluorinated hydrocarbon additives, one or more alcohol additives, or combinations of one or more alcohols and one or more fluorinated hydrocarbons. Such a composition can be obtained from a subterranean formation by contacting one or more hydrocarbons in a subterranean formation with heated water or steam, contacting the one or more hydrocarbons in the subterranean formation with additive(s), such as one or more fluorinated hydrocarbons, one or more alcohols, or combinations of one or more alcohols and one or more fluorinated hydrocarbons, as described herein, and recovering the resulting emulsion from the formation. Such a composition can also be obtained by contacting the hydrocarbon with water or steam, as well as additive(s), such as one or more fluorinated hydrocarbons, one or more alcohols, or combinations of one or more alcohols and one or more fluorinated hydrocarbons, as described herein, outside of the subterranean formation.

Also disclosed is a composition including water or steam, an additive, such as one or more fluorinated hydrocarbons, one or more alcohols, or combinations of one or more alcohols and one or more fluorinated hydrocarbons, as described herein, and bitumen. Such a composition can be obtained from a subterranean formation by contacting bitumen in a subterranean formation with heated water or steam, contacting the bitumen in the subterranean formation with the additive(s), and recovering the resulting emulsion from the formation. The water or steam and additive can be added independently of each other or can be added as a mixture. Such a composition can also be obtained by contacting the bitumen with water or steam, as well as an additive, outside of the subterranean formation.

Various additives are contemplated by the present disclosure. The additive disclosed herein can be, for example, one or more fluorinated hydrocarbons. Typically, unless surface or strip mining techniques are being used, the fluorinated hydrocarbon has an atmospheric boiling point of less than or equal to about 300° C. The fluorinated hydrocarbon should have volatility sufficient to allow for delivery to the production front unless surface or strip mining techniques are being used. Examples of fluorinated hydrocarbon additives useful in connection with the present disclosure include, but are not limited to, trifluoroethanol, trifluoropropanol, trifluorobutanol, allylhexafluoroisopropanol, hexafluoroisopropanol, trifluoroacetic acid, methyl trifluoroacetate, ethyl trifluoroacetate, isopropyl trifluoroacetate, trifluoroacetaldehydemethyl hemiacetal, trifluoroacetaldehyde ethyl hemiacetal, trifluoroacetic anhydride, trifluoroacetone, fluorotoluene, and any combination or mixture thereof. Typically, the one or more fluorinated hydrocarbons are added at a concentration from about 25 to about 50,000 ppm by weight of the fluorinated hydrocarbon in the steam (wt/wt fluorinated hydrocarbon additive to steam basis). Another possible dosage of the fluorinated hydrocarbon is from about 1,000 ppm to about 5,000 ppm, and another possible dosage is from about 100 to about 1,000 ppm.

Even further, other additives are contemplated by the present disclosure. The additives disclosed herein can be, for example, one or more alcohols. Typically, unless surface or strip mining techniques are being used, the one or more alcohols have an atmospheric boiling point of less than or equal to about 300° C. The one or more alcohols should have volatility sufficient to allow for delivery to the production front unless surface or strip mining techniques are being used. Examples of alcohol additives useful in connection with the present disclosure include, but are not limited to, $C_1$ alcohols (i.e. methanol), $C_2$ alcohols, $C_3$ alcohols, $C_4$ alcohols, $C_5$ alcohols, $C_6$ alcohols, $C_7$ alcohols, $C_8$ alcohols, $C_9$ alcohols, or $C_{10}$ alcohols, $C_{11}$ alcohols, $C_{12}$ alcohols, $C_{13}$ alcohols, $C_{14}$ alcohols, $C_{15}$ alcohols, and any combination, mixture, or isomer thereof. For example, the alcohol additives could be any combination of $C_1$-$C_{15}$ alcohols, or any combination of $C_2$-$C_7$ alcohols, or any combination of $C_8$-$C_{15}$ alcohols, or any combination of $C_2$-$C_5$ alcohols, etc. Useful additives in accordance with the present disclosure can also be defined as methanol, ethanol, 1-propanol, 1-butanol, 1-pentanol, 2-pentanol, 3-methyl-1-butanol, 2-methyl-1-butanol, 2-methyl-2-butanol, or any combination thereof. Further, any of the aforementioned alcohol additives can be added together as a mixture and any of the aforementioned fluorinated hydrocarbon additives can also be added into the mixture.

For example, in an aspect, the additive used in the disclosed process can be ethanol. In another aspect, the additive used can be 1-butanol. In another aspect, the additive used can be 2-pentanol. In another aspect, the additive used can be a mixture of propanol, butanol, and 1-pentanol. In another aspect, the additive used can be a mixture of trifluoroethanol (TFE) and ethanol. In another aspect, the additive used can be a mixture of trifluoroethanol (TFE) and butanol. In another aspect, the additive used can be a mixture of ethanol and 1-pentanol. As previously noted, any combination of one or more alcohols or any combination of one or more fluorinated hydrocarbons can be used in accordance with the processes disclosed herein, and even further, any combination of one or more alcohols combined with one or more fluorinated hydrocarbons can be used.

Typically, the one or more alcohols are added at a concentration from about 25 to about 50,000 ppm by weight of the one or more alcohols, or combination of one or more alcohols and one or more fluorinated hydrocarbons, in the steam (wt/wt additive (alcohol, combination of alcohols, or combination of one or more alcohols with one or more fluorinated hydrocarbons) additive to steam basis). One possible dosage of the one or more alcohols additive, or the one or more alcohols combined with one or more fluorinated hydrocarbons additive, is from about 500 ppm to about 2,000 ppm, and another possible dosage is about 1,000 to about 2,000 ppm. Also, it is possible to add the additive at a dosage of 1,000 ppm by weight of the additive in the steam.

The foregoing additives or combinations of additives increase the amount of bitumen produced for the same steam input. Without wishing to be bound by any theory, it is considered that these additives or combinations of additives could possess properties such as directly improving the heat efficiency within a formation as well as reducing the oil-water interfacial tension. Moreover, the disclosed additives or combinations of additives will lower the steam to oil ratio meaning less steam will be necessary to produce the same amount of hydrocarbon or bitumen, or additional hydrocarbon or bitumen will be produced for the same steam input, due to the presence of the additive(s). Further, these additives or combinations of additives will not interfere with the resulting emulsion such that it cannot be broken. When the emulsion product is recovered from the formation, it must be broken to obtain the desired hydrocarbons. It has been found that certain amine additives can interfere with this process such that the produced emulsion cannot be broken and therefore, the desired hydrocarbon(s) cannot readily be obtained. The additive(s) of the present disclosure overcome this problem. Finally, the presently disclosed additives or combinations of additives are volatile enough to be carried with the steam through the sand pack to reach the bitumen pay.

Processes wherein the additive(s) or combinations of additives of the present disclosure can be beneficial to the hydrocarbon recovery include, but are not limited to, cyclic steam stimulation, steam assisted gravity drainage, vapor recovery extraction methods, mining or extraction techniques, and the like.

The foregoing may be better understood by reference to the following examples, which are intended only for illustrative purposes and are not intended to limit the scope of the invention.

Example 1

A sample of oilsands ore (15 g) was charged into a pre-weighed stainless steel holder containing several holes. The oilsands ore contained 13.51% bitumen, 83.45% solids and 3.04% water. A cellulose thimble to account for any solids extracted as a consequence of the method, approximately 4 cm in length, was placed beneath the stainless holder and the two were placed into a jacket Soxhlet extractor. Deionized water or process boiler feed water (BFW), as specified, (300 mL) and trifluoroethanol were charged into a 500 mL round bottom flask beneath the extractor unit. Blank runs were additionally conducted in the same manner excluding trifluoroethanol. The extractor and round bottom flask were wrapped with insulation and aluminum foil, and the extraction run at high temperature for 4 hours. The extraction was then allowed to cool, the stainless bolder removed, wiped of any extracted bitumen, and allowed to dry in a 105° C. oven for 2 days. The cellulose thimble containing any solids extracted as a consequence of the extraction process was placed in the oven to dry overnight.

Following drying in the oven, the stainless holder and cellulose thimble were allowed to cool to room temperature and weighed. The amount of bitumen extracted was determined based on the amount of bitumen initially present in the ore, accounting for solids losses in the extraction process and water losses in the oven. To determine the amount of bitumen extracted, it was assumed that 66% of the connate water in the original ore sample would be lost over a 2 day period in the oven (Equation 1).

Bitumen extracted (%) using Test Method A.

Equation 1
$$\text{Bitumen Extracted (\%)} = \frac{\text{Ore assuming 66\% of connate H}_2\text{O lost (g)} - (\text{Final ore (g)} + \text{Dried solids extracted (g)})}{\text{Initial bitumen in ore (g)}} \times 100\%.$$

Dosages of 500 or 1,000 ppm of trifluoroethanol (based on the water) were tested (FIG. 1 and Table 1). The mean bitumen extracted for the blank (n=5) was 15.06% (SD=1.87%), the 500 ppm dose (n=8) was 26.53% (SD=5.99), 1,000 ppm dose in deionized water (n=3) was 29.11% (SD=8.20%), and 1,000 ppm in BFW was 37.38% (SD=6.37%) (Table 1). All of the trifluoroethanol additions resulted in p-values of less than 0.05 when compared to the blank, and were considered to be statistically significant (Table 2).

TABLE 1

Mean, standard deviation and number of runs for the trifluoroethanol runs.

| Level | Number of Runs | Mean Bitumen Extracted (%) | Std Dev |
|---|---|---|---|
| Blank | 5 | 15.06 | 1.87 |
| Trifluoroethanol 1,000 ppm | 3 | 29.11 | 8.20 |
| Trifluoroethanol 1,000 ppm BFW | 3 | 37.38 | 6.37 |
| Trifluoroethanol 500 ppm | 8 | 26.53 | 5.99 |

TABLE 2 p-values comparing the trifluoroethanol and blank runs.

| Level | −Level | p-Value |
|---|---|---|
| Trifluoroethanol 1,000 ppm BFW | Blank | <.0001* |
| Trifluoroethanol 1,000 ppm | Blank | 0.0040* |
| Trifluoroethanol 500 ppm | Blank | 0.0029* |

Example 2

Figure 2:
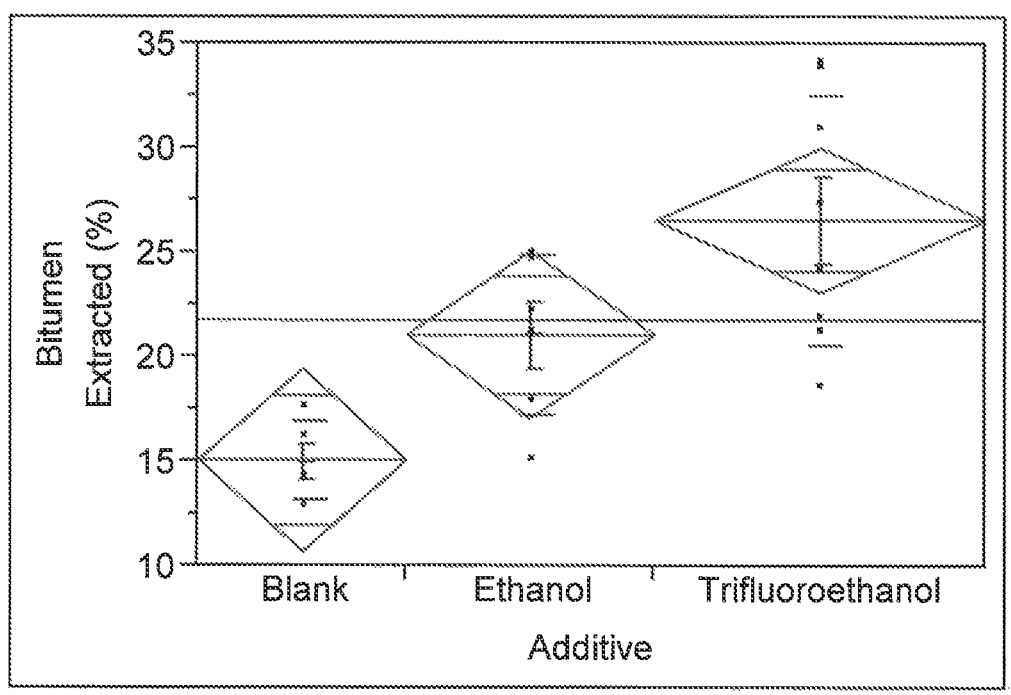
FIG. 2 is a one-way analysis of bitumen extracted (%) vs. ethanol and trifluoroethanol.

A comparison between ethanol and trifluoroethanol was carried out (both dosed at 500 ppm). Ethanol (n=6) resulted in a mean bitumen extracted of 21.04% (SD=3.88%) while the same dose of trifluoroethanol (n=8) resulted in 26.53% (SD=5.99%) bitumen extracted (FIG. 2 and Table 3). The blank values were as above. Considering this data, trifluoroethanol outperforms both ethanol and the blank, with p-values of less than 0.05 in both cases (Table 4).

TABLE 3

Mean, standard deviation, and number of runs for the ethanol and trifluoroethanol runs.

| Level | Number of Runs | Mean Bitumen Extracted (%) | Std Dev |
|---|---|---|---|
| Blank | 5 | 15.06 | 1.87 |
| Ethanol | 6 | 21.04 | 3.88 |
| Trifluoroethanol | 8 | 26.53 | 5.99 |

TABLE 4 p-values for the trifluoroethanol and blank runs.

| Level | −Level | p-Value |
|---|---|---|
| Trifluoroethanol | Blank | 0.0005* |
| Ethanol | Blank | 0.0482* |
| Trifluoroethanol | Ethanol | 0.0428* |

Example 3

Oilsands ore (15 g) was charged into a stainless holder containing several holes on the bottom and an open top. For these experiments, extraction glassware that enabled direct contact of steam and volatilized additive with the ore was used. Deionized water (200 mL) and trifluoroethanol (1,000 ppm based on the water) were added to the round bottom portion of extraction glassware. Directly above the round bottom portion of the extraction flask sat a coarse stainless steel grid to support the holder containing the oilsands ore sample. The extraction flask was wrapped with insulation and aluminum foil and the experiment was refluxed for 4 h. The collected bitumen in water was separated using a rotary evaporator (rotovap) and subsequently extracted with toluene into a 100 mL volumetric flask. Bitumen adhered to the sides of the flask was extracted with toluene and added to the bitumen obtained following rotovap separation. The bitumen on the sides of the stainless holder was accounted for by collecting with a pre-weighed cleaning tissue. The pH of the water following rotovap separation was measured.

Following this initial extraction, the same stainless holder with ore was added back to extraction vessel along with fresh deionized water (200 mL) and trifluoroethanol (1,000 ppm). The experiment was carried out in the same manner as the first incremental extraction. This test was repeated a third time with the same stainless holder and ore. Following the three incremental recoveries, the remaining bitumen in the ore was determined by Dean-Stark extraction with toluene. A blank was also run in the same manner without trifluoroethanol.

The bitumen extracted with steam for each increment (runs 1-3) was compared to the total bitumen extracted and expressed as % bitumen extracted (Equation 2). The total bitumen extracted with steam for the three runs was compared to the total bitumen extracted and expressed as % total bitumen extracted (Equation 3).

Incremental bitumen extracted calculation for runs 1-3.

$$\text{Bitumen Extracted Run 1(\%)} = \frac{\text{Bitumen extracted with steam run 1 (g)}}{\text{Total bitumen extracted with steam runs 1-3 (g)} + \text{Bitumen extracted with toluene (g)}} \times 100\%.$$

Equation 2

Total bitumen extracted calculation for incremental recovery test.

$$\text{Total Bitumen Extracted (\%)} = \frac{\text{Total Bitumen extracted with steam run 1-3 (g)}}{\text{Total bitumen extracted with steam runs 1-3 (g)} + \text{Bitumen extracted with toluene (g)}} \times 100\%.$$

Equation 3

Following the first run, the blank extracted 28.60% of the bitumen in the sample whereas the trifluoroethanol extracted 26.40%. Considering this test method, the efficacy of trifluoroethanol can be seen in the second and third runs. The bitumen extracted for the blank runs 2 and 3 was 11.79% and 5.46%, respectively. The bitumen extracted when using trifluoroethanol does not decline as rapidly, with 17.80% and 14.05% bitumen being extracted for runs 2 and 3, respectively. The overall bitumen extracted for the blank was 45.84% and with trifluoroethanol was 58.25%. Results are shown in Table 5.

TABLE 5

Incremental bitumen extracted results for the blank and trifluoroethanol (1,000 ppm).

| Additive | pH (Run 1) | pH (Run 3) | pH (Run 3) | Bitumen Extracted Run 1 (%) | Bitumen Extracted Run 2 (%) | Bitumen Extracted Run 3 (%) | Total Bitumen Extracted (%) |
|---|---|---|---|---|---|---|---|
| Blank | 8.94 | 8.65 | 9.19 | 28.60 | 11.79 | 5.46 | 45.84 |
| Trifluoroethanol | 8.78 | 8.87 | 8.79 | 26.40 | 17.80 | 14.05 | 58.25 |

Example 4

Deionized water (100 mL) and trifluoroethanol (1,000 ppm based on the water) were charged into a laboratory autoclave reader with a volume capacity of 600 mL and fit with a glass liner. A 15 g oilsands ore sample, with the same composition as in Example 1, was added to a stainless holder with several holes on the bottom and an open top. The sample was placed above the water/trifluoroethanol mixture so as to not directly contact the water and trifluoroethanol prior to the start of the experiment. The reactor was sealed and heated to 200° C. to 5 hours. During this time, the internal pressure of the vessel reached 200 psig. The reactor was then allowed to cool to room temperature, opened, and the water was separated from the bitumen. The resulting bitumen was extracted with toluene into a 100 mL volumetric flask. Any bitumen remaining on the outside of the stainless holder was accounted for by collecting onto a pre-weighed cleaning tissue. The remaining bitumen in the ore sample was then determined by Dean-Stark extraction with toluene. A blank was also run in the same manner without trifluoroethanol. The resulting bitumen extracted for the blank was found to be 6.42% and with the addition of trifluoroethanol, extraction increased to 13.05%.

Example 5

Bitumen extraction studies for Examples 5-8 were carried out according to the following procedures. These examples used a glass laboratory extraction vessel that enabled steam and volatilized additive to directly contact the core sample. For these experiments, 15 g of core sample was added to a stainless holder containing several holes and a closed top. Previous experiments using this extraction vessel were run with the stainless holder having an open top. The core sample had a composition of 15.23% bitumen, 83.58% solids, and 1.37% water (based on the average of five Dean-Stark runs). Deionized water (200 mL) and/or additive(s) were added to the round bottom portion of the extraction vessel. The vessel was fitted with insulation and sufficient heat was applied to allow the contents to reflux for 4 hours at ambient pressure. The additive(s) dosage was based on the concentration in water. Following the experiment, the water was separated from the collected bitumen. The bitumen component remained in the vessel, was removed with toluene, and subsequently placed into a 100 mL volumetric flask. The bitumen on the sides of the stainless holder was accounted for by collecting with a pre-weighed cleaning tissue. The amount of bitumen remaining in the core following steam extraction was determined by Dean-Stark extraction with toluene. The bitumen recovered with steam, or steam together with additive(s), was compared to the total bitumen in the sample and expressed as % bitumen extracted (Equation 4).

Bitumen extraction calculation for example 5-8.

Equation 4

$$\text{Bitumen Extracted (\%)} = \frac{\text{Bitumen extracted with steam (g)}}{\text{Bitumen extracted with steam (g)} + \text{Bitumen extracted with toluene (g)}} \times 100\%.$$

In Example 5, using just water for reflux (blank) resulted in a mean bitumen extracted of 6.2% (Table 6). Addition of the alcohol additives significantly improved the bitumen extraction. The majority of the studies were carried out at a dosage of 1,000 ppm (based on the water fraction). When blends were studied they were also conducted to total 1,000 ppm product dosage, however some runs were carried out at a total product dosage of 1,500 or 2,000 ppm in subsequent examples.

Figure 3:
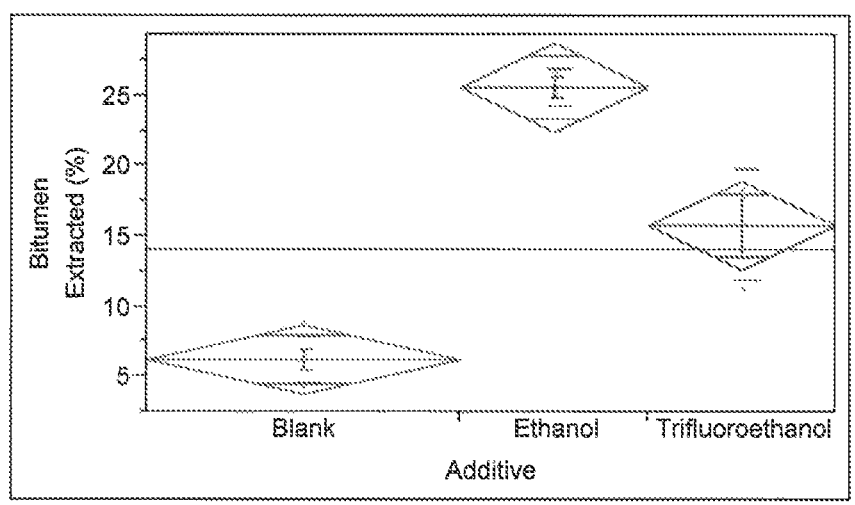
FIG. 3 is a one-way analysis of bitumen extracted (%) vs. blank, ethanol (1,000 ppm), and trifluoroethanol (1,000 ppm).

Experimental runs were carried out to compare the performance of ethanol (200 proof) to trifluoroethanol. Runs without additive (n=5) resulted in a mean bitumen extraction of 6.2±1.7%. Addition of 1,000 ppm of ethanol (n=3) resulted in a mean bitumen extraction of 25.0±1.3% and 1,000 pm trifluoroethanol (n=3) resulted in an extraction of 1.58±4.0% (FIG. 3, Table 6). Both additives outperform the blank, and additionally, ethanol displayed enhanced performance compared to trifluoroethanol (student's t test, p=0.001).

TABLE 6

Mean bitumen extraction, standard deviation, and number of runs for the blank, ethanol (1,000 ppm) and trifluoroethanol (1,000 ppm).

| Level | Number of Runs | Mean Bitumen Extraction (%) | Std Dev |
|---|---|---|---|
| Blank | 5 | 6.23 | 1.65 |
| Ethanol | 3 | 25.58 | 1.28 |
| Trifluoroethanol | 3 | 15.76 | 3.95 |

TABLE 7

Comparative data with p-values for the blank, ethanol, and trifluoroethanol.

| Level | −Level | p-value |
|---|---|---|
| Ethanol | Blank | <.0001* |
| Ethanol | Trifluoroethanol | 0.0010* |
| Trifluoroethanol | Blank | 0.0006* |

Example 6

Figure 4:
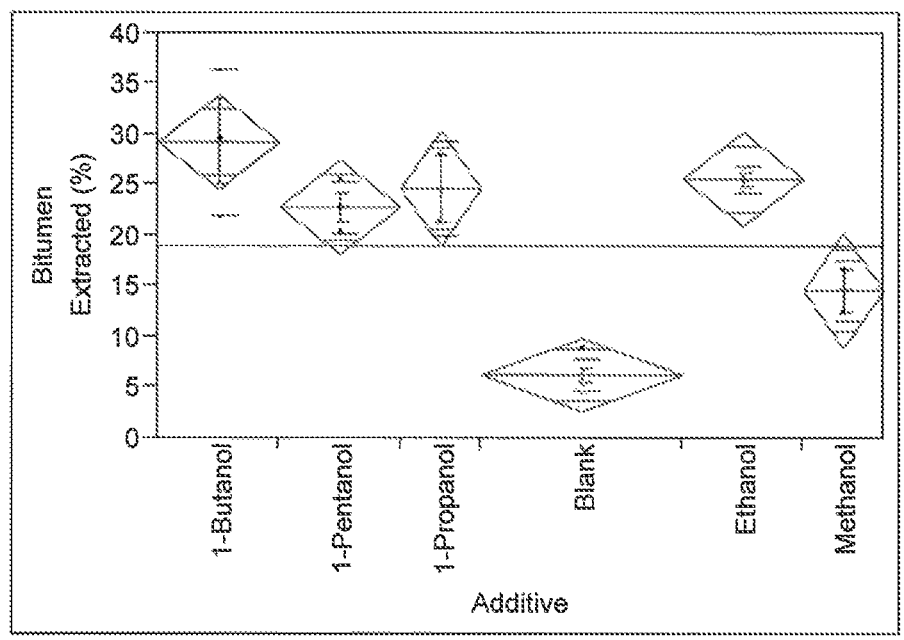
FIG. 4 shows comparative data for the blank, methanol, ethanol and n-alcohols, propanol, butanol and pentanol. All alcohols were dosed at 1,000 ppm.

A comparative study was undertaken looking at $C_1$-$C_5$ (methanol-pentanol) straight chain alcohols for their efficacy in enhancing bitumen extraction. All of the alcohols tested were closed at 1,000 ppm and displayed enhanced bitumen extraction over the blank (FIG. 4, Table 8). In addition, methanol was outperformed by the other alcohols studied. From this data set, no statistically significant differences in bitumen extraction were observed between ethanol, 1-propanol, 1-butanol and 1-pentanol.

TABLE 8

Mean bitumen extraction, standard deviation and number of experimental runs completed for $C_1$-$C_5$ alcohols.

| Level | Number of Runs | Mean Bitumen Extracted (%) | Std Dev |
|---|---|---|---|
| 1-Butanol | 3 | 29.25 | 7.28 |
| 1-Pentanol | 3 | 22.82 | 2.53 |
| 1-Propanol | 2 | 24.65 | 4.65 |
| Blank | 5 | 6.23 | 1.65 |
| Ethanol | 3 | 25.58 | 1.28 |
| Methanol | 2 | 14.58 | 3.05 |

TABLE 9

Comparative data with p-values for additives tested.

| Level | −Level | p-Value |
|---|---|---|
| 1-Butanol | Blank | <.0001* |
| Ethanol | Blank | <.0001* |
| 1-Propanol | Blank | <.0001* |
| 1-Pentanol | Blank | <.0001* |
| 1-Butanol | Methanol | 0.0009* |
| Ethanol | Methanol | 0.0068* |
| 1-Propanol | Methanol | 0.0185* |
| Methanol | Blank | 0.0193* |
| 1-Pentanol | Methanol | 0.0310* |
| 1-Butanol | 1-Pentanol | 0.0546 |

Example 7

Figure 5:
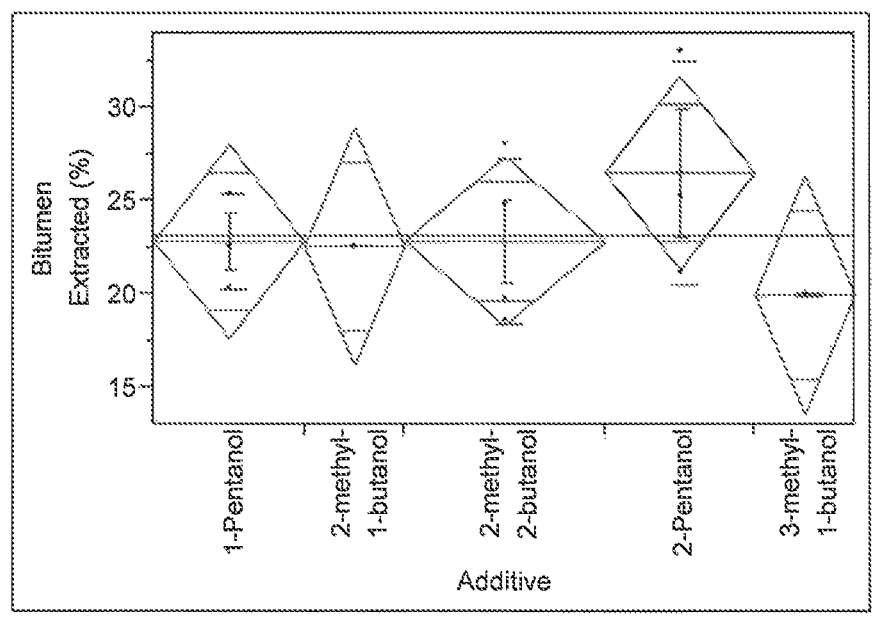
FIG. 5 shows comparative data for the $C_5$ alcohol derivatives. All additives were dosed at 1,000 ppm.

A study was conducted looking at various isomers of $C_5$ alcohols to determine if any performance difference could be observed. In addition to 1-pentanol previously tested, 2-pentanol, 3-methyl-1-butanol, 2-methyl-1-butanol and 2-methyl-2-butanol were run at a dosage of 1,000 ppm. No statistically significant performance difference between these additives was observed (FIG. 5, Tables 10 & 11).

TABLE 10

Mean bitumen extracted, standard deviation and number of experimental runs completed for the C5 alcohol isomers.

| Level | Number of Runs | Mean Bitumen Extracted (%) | Std Dev |
|---|---|---|---|
| 1-Pentanol | 3 | 22.82 | 2.53 |
| 2-methyl-1-butanol | 2 | 22.57 | 0.021 |
| 2-methyl-2-butanol | 4 | 22.83 | 4.41 |
| 2-Pentanol | 3 | 26.51 | 6.02 |
| 3-methyl-1-butanol | 2 | 19.95 | 0.028 |

TABLE 11

Comparative data with p-values for additives tested.

| Level | −Level | p-value |
|---|---|---|
| 2-Pentanol | 3-methyl-1-butanol | 0.1058 |
| 2-Pentanol | 2-methyl-1-butanol | 0.3077 |
| 2-Pentanol | 1-Pentanol | 0.2878 |
| 2-Pentanol | 2-methyl-2-butanol | 0.2588 |
| 2-methyl-2-butanol | 3-methyl-1-butanol | 0.4269 |
| 1-Pentanol | 3-methyl-1-butanol | 0.4512 |
| 2-methyl-1-butanol | 3-methyl-1-butanol | 0.5293 |
| 2-methyl-2-butanol | 2-methyl-1-butanol | 0.9407 |
| 1-Pentanol | 2-methyl-1-butanol | 0.9451 |
| 2-methyl-2-butanol | 1-Pentanol | 0.9983 |

Example 8

Experimental runs were also completed studying alcohol blends (Table 12). All of the blends outperformed the blank (mean bitumen extracted of 6.2%). Alcohols were also blended with trifluoroethanol (TFE) which also resulted in enhanced bitumen extraction (Table 13).

TABLE 12

Bitumen extracted for a blend of three alcohols added in a combined dose of 1,000 ppm.

| Additive | Dose (ppm) | Bitumen Extracted (%) |
|---|---|---|
| Ethanol/Propanol/Butanol | 400/400/200 | 12.68 |
| Ethanol/Propanol/Butanol | 400/400/200 | 13.79 |
| Propanol/Butanol/1-Pentanol | 400/400/200 | 22.99 |
| Propanol/Butanol/1-Pentanol | 400/400/200 | 20.77 |

TABLE 13

Bitumen extracted for alcohols blended with trifluoroethanol (TFE).

| Additive | Dose (ppm) | Bitumen Extracted (%) |
|---|---|---|
| TFE/Ethanol | 500/500 | 19.05 |
| TFE/Ethanol | 500/500 | 18.06 |
| TFE/Ethanol | 200/800 | 22.53 |
| TFE/Ethanol | 200/800 | 25.97 |
| TFE/Butanol | 1000/1000 | 32.08 |
| TFE/Ethanol/Propanol | 200/400/400 | 18.63 |

TABLE 13-continued

Bitumen extracted for alcohols blended with trifluoroethanol (TFE).

| Additive | Dose (ppm) | Bitumen Extracted (%) |
|---|---|---|
| TFE/Ethanol/Propanol | 200/400/400 | 20.62 |
| TFE/Pentanol | 500/500 | 21.49 |
| TFE/Pentanol | 500/500 | 14.91 |
| Ethanol/1-Pentanol | 500/500 | 23.81 |
| TFE/Ethanol | 1000/500 | 19.94 |
| TFE/Ethanol | 500/1000 | 14.75 |
| TFE/Ethanol | 1000/1000 | 26.23 |
| TFE/Ethanol/1-Pentanol | 167/667/167 | 14.64 |
| TFE/Ethanol/1-Pentanol | 667/167/167 | 21.22 |
| TFE/Ethanol/1-Pentanol | 333/333/333 | 11.53 |
| TFE/Ethanol/1-Pentanol | 167/167/667 | 15.06 |
| TFE/Ethanol | 100/900 | 15.50 |
| TFE/Ethanol | 750/250 | 21.70 |
| TFE/Ethanol | 250/750 | 19.43 |

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood, that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A composition comprising a hydrocarbon and an injectable mixture of steam, trifluoroethanol, and one or more alcohols selected from ethanol, 1-butanol, 2-pentanol, a mixture of propanol and butanol and 1-pentanol, or a mixture of ethanol and 1-pentanol.

2. The composition of claim 1 wherein the alcohol is ethanol.

3. The composition of claim 1 wherein the alcohol is butanol.

4. The composition of claim 1 wherein the temperature of the mixture is about 500° C.

5. The composition of claim 4 wherein the composition is under applied pressure.

6. The composition of claim 5 wherein the composition is present in an injector well or in a well head.

7. The composition of claim 1 wherein the composition is present in a steam chamber, in a steam header, or in a boiler feed.

8. A composition comprising a hydrocarbon and a mixture consisting of steam, trifluoroethanol, and one or more alcohols selected from ethanol, 1-butanol, 2-pentanol, a mixture of propanol and butanol and 1-pentanol, or a mixture of ethanol and 1-pentanol.

9. The composition of claim 8 wherein the alcohol is ethanol.

10. The composition of claim 8 wherein the alcohol is butanol.

11. The composition of claim 8 wherein the temperature of the mixture is about 500° C.

12. The composition of claim 8 wherein the composition is under applied pressure.

13. The composition of claim 8 wherein the composition is present in an injector well or in a well head.

14. The composition of claim 8 wherein the composition is present in a steam chamber, in a steam header, or in a boiler feed.

* * * * *